United States Patent
Chase-Salerno et al.

(10) Patent No.: US 7,240,107 B2
(45) Date of Patent: Jul. 3, 2007

(54) SELF REPLICATING INSTALLATION METHOD FOR OPERATING SYSTEM CLUSTERS

(75) Inventors: Michael S. Chase-Salerno, New Paltz, NY (US); Sean L. Dague, Fishkill, NY (US); Richard Ferri, Ulster Park, NY (US); Vasilios F. Hoffman, Middletown, CT (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 10/271,276

(22) Filed: Oct. 15, 2002

(65) Prior Publication Data

US 2004/0073636 A1    Apr. 15, 2004

(51) Int. Cl.
    *G06F 15/177* (2006.01)
(52) U.S. Cl. .................. 709/222; 709/222; 717/178
(58) Field of Classification Search ................ 709/222; 717/178
    See application file for complete search history.

(56) References Cited

U.S. PATENT DOCUMENTS

| | | | | |
|---|---|---|---|---|
| 5,636,345 | A * | 6/1997 | Valdevit | 709/224 |
| 6,101,528 | A | 8/2000 | Butt | |
| 6,130,877 | A * | 10/2000 | Lee | 370/229 |
| 6,233,601 | B1 * | 5/2001 | Walsh | 709/202 |
| 6,289,511 | B1 | 9/2001 | Hubinette | |
| 2003/0167295 | A1 * | 9/2003 | Choo | 709/104 |
| 2003/0217171 | A1 * | 11/2003 | Von Stuermer et al. | 709/231 |

FOREIGN PATENT DOCUMENTS

| | | |
|---|---|---|
| JP | PUPA03-045050 | 2/1991 |
| JP | PUPA04-082436 | 3/1992 |
| JP | PUPA09-036858 | 2/1997 |
| JP | PUPA09-231180 | 9/1997 |
| JP | PUPA2000-076162 | 3/2000 |
| JP | PUPA2001-092641 | 4/2001 |

OTHER PUBLICATIONS

F. Sano et al.—"Simulating Self-Reproduction Mechanisms of the Network Worm", The Institute of Electronics, Information and Communication Engineers, Technical Report of IEICE. ISEC95-15 (Sep. 1995).

(Continued)

*Primary Examiner*—Zarni Maung
*Assistant Examiner*—Glenford Madamba
(74) *Attorney, Agent, or Firm*—Eugene I. Shkurko; Saul A. Seinberg; Heslin Rothenberg Farley & Mesiti P.C.

(57) ABSTRACT

A method of copying an operating system image in a cluster computing environment that has virtually unlimited scale does not require the strict amounts of control over installation that current methods have, but rather causes operating system images to propagate themselves in a cluster environment, spreading from one node to the next until the entire cluster is installed. Broadcast storms and response storms during installation are avoided by employing a regulation method that automatically delays installation during busy periods. The method does not require any prior knowledge of the number of nodes in the cluster, or the cluster network configuration.

22 Claims, 1 Drawing Sheet

OTHER PUBLICATIONS

M. Sato, "Network Strategy of Toyo Corporation", Computer & Network LAN, Ohm Publishing Co., Ltd., vol. 17, No. 5, p. 15-19, May 01, 1999.

"New Security Technique for e-Business", Computer & LAN, Ohm Publishing Co., Ltd., vol. 20, No. 2, p. 86-91, Feb. 01, 2002.

T. Hanzawa, "Thorough Understanding of LAN Switch", NIKKEI Network, NIKKEI PB Publishing, vol. 1, p. 082-087, Apr. 22, 2000.

S. Ohara, "New Common Knowledge of LAN Construction, '98", NIKKEI Open System, NIKKEI BP Publishing, vol. 57, p. 198-205, Dec. 15, 1997.

* cited by examiner

SELF REPLICATING INSTALLATION METHOD FOR OPERATING SYSTEM CLUSTERS

TECHNICAL FIELD

The field of the invention is that of installing operating systems in computing systems having clusters of CPUs.

BACKGROUND OF THE INVENTION

The value of clustering to provide inexpensive computing is widely known for web serving, high performance computing and other fields. However, the size of the clusters has generally stagnated at around 512 nodes, due largely in part to the problem of how to initially set up larger clusters with a version of the operating system. Clusters today typically employ either the single server technique or the hierarchical servers technique to install a cluster.

In the single server technique, all nodes are installed from a single workstation that has all the intelligence and software to be an installation server (i.e. extra software required for installation in addition to the operating system software common to the ordinary CPUs (nodes in the system). In the hierarchical technique, the primary server installs a secondary set of installation servers and propagation of the operating system occurs in tightly controlled "waves". The primary server installs the secondary servers, which install the remainder of the clients. Both methods suffer from a phenomenon known as "broadcast storms". Broadcast storms occur when many nodes are powered up and broadcast network packets at regular short intervals simultaneously, saturating the network and eventually causing all network traffic to fail.

SUMMARY OF THE INVENTION

The invention relates to a method of installing programs having a rate limiting feature in which installing servers respond to requests from clients on a probabilistic basis, thereby reducing the chance of overloading the bandwidth of the network.

A feature of the invention is a dynamic request rate for installation from clients, based on the [total] rate of requests by [all] other clients.

Another feature of the invention is the installation in a client of software sufficient to enable that client to install the program on other clients, so that a client requesting installation becomes at least temporarily an installing server responding to requests from clients on a probabilistic basis at a lower rate than the server that had installed it.

Another feature of the invention is a self-adjusting request rate by a client based on the number of requests by other clients.

Another feature of the invention is the allocation by each installing server in a client of a limited range of addresses of requesting clients within which a newly-created installation server can respond.

DETAILED DESCRIPTION

Figure 1:
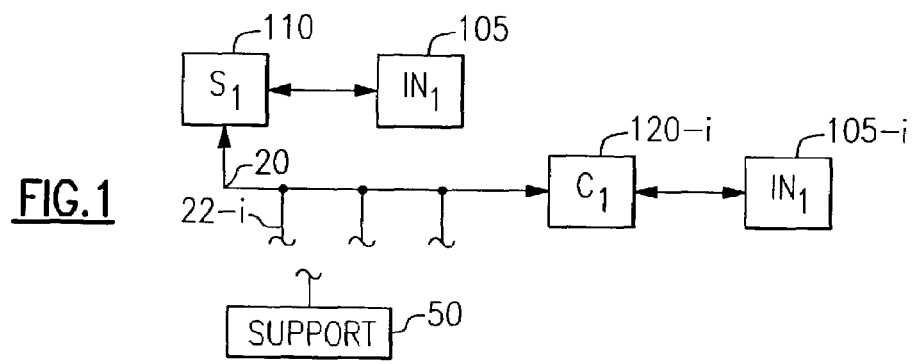
FIG. 1 illustrates schematically a computer cluster for use with the invention.

Referring to FIG. 1, there is shown in schematic form a portion of a computer cluster 100 according to the invention, in which box 110 represents schematically a computer, including CPU, disk drive, memory and other peripherals located in physical proximity to the CPU. Box 105 represents an installation module comprising software required to install the software in question on another computer, together with associated hardware and firm-ware such as the entire Linux operating system image, and the installation programs according to the invention that contact and install new client nodes.

Line 20 represents communication links between nodes (or CPUs) in the cluster. The links may be wireless, a conventional bus, a combination of the two, etc. Lines 22-$i$ represent links to other nodes in the cluster. The network of computers will have a total network bandwidth of data that can be carried and a total network bandwidth rate that is the number of installation requests per unit of time that can be carried by the network.

The problem addressed by the present invention is that of installing throughout the nodes of the cluster in a timely fashion, without stimulating a "storm"; i.e. a number of simultaneous transactions over the communications links that overload the capacity of the communication system between nodes. In contemporary computing technology, architectures of tens of thousands of nodes have been planned, but at present it is not practical to install and upgrade software on a cluster of this magnitude.

In the Self-Replicating Installation Method (SRIM) according to the invention, all nodes in the cluster become installation servers instead of having controlled, select sets of nodes become installation servers. Using SRIM, installation is not controlled, it spreads throughout the cluster in a non-deterministic fashion until all nodes in the cluster are installed.

Since in a large cluster (one greater than 512 nodes) simply powering on the nodes and having them broadcast an installation request would immediately cause a broadcast storm, SRIM employs the Client Broadcast Regulation Method (CBRM) to limit the requests for installation coming from client nodes to force nodes to broadcast looking for a server less often, at ever increasing intervals between requests. Similarly, having many servers responding to client requests could cause an analogous "response storm". To avoid this, SRIM employs the Server Response Regulation Method (SRRM) to reduce the number of server responses.

Self Replicating Installation Method

The SRIM starts with a single node 110, the first installation server, installed with a copy of the operating system and all software required to install a client node as an installation server itself (denoted in FIG. 1 by box 105 and 105-$i$). While not operating system specific, in the case of Linux the first server would have a complete version of Linux installed, plus all the RPMs (installation packages) required to install another node, and have all necessary installation services running. The software required for installation by various operating systems is well known throughout the computing industry. Server 110 may be installed by any convenient method recommended by the manufacturer.

With the first server installed and ready to start installing clients, some empirically determined portion of the clients are powered up and begin broadcasting using the CBRM (described below). In the preferred embodiment, all the clients are powered up and begin the broadcasting process. The server is conditioned with a well-known protocol such as DHCP. DHCP is a protocol used to communicate between a server and compute node during the initial boot of the compute node. DHCP defines the protocol by which the server supplies networking and startup information to the node, such as its IP address and gateway, and provides an initial bringup kernel to the node.

Once the server accepts its first installation request, it responds with an answer, thus attaching itself to a single client. The client also ignores responses from other servers, if any. Once attached, the server shuts down its DHCP service, ignoring further requests for installation, and begins installing the client. By shutting down its DHCP, the server eliminates any further DHCP responses by it, thereby reducing network traffic. The server then installs the client with a full version of the operating system, plus any services or installable images the client will need to replicate itself (stored in box 105). Once the client is completely installed, it reboots itself and it becomes itself, a peer server. The terms "client" and "installation server" depend on time. A client is a node that has not been installed or upgraded; once upgraded, the former client becomes another server. The foregoing is a reflection of the peer-to-peer approach taken according to the invention. Once a server is done installing a client, it turns its DHCP service back on, and is ready to service to another client, meaning to accept a request and perform the installation.

The installation response by a server is "probabilistic", meaning that the server responds or not to a request that it hears, depending on a probability; e.g. the server calculates a random number from one to 100 and responds or not, depending on whether the answer is in or out of a range (0–25, say) set by a reference probability (in this case 25%).

Figure 2:
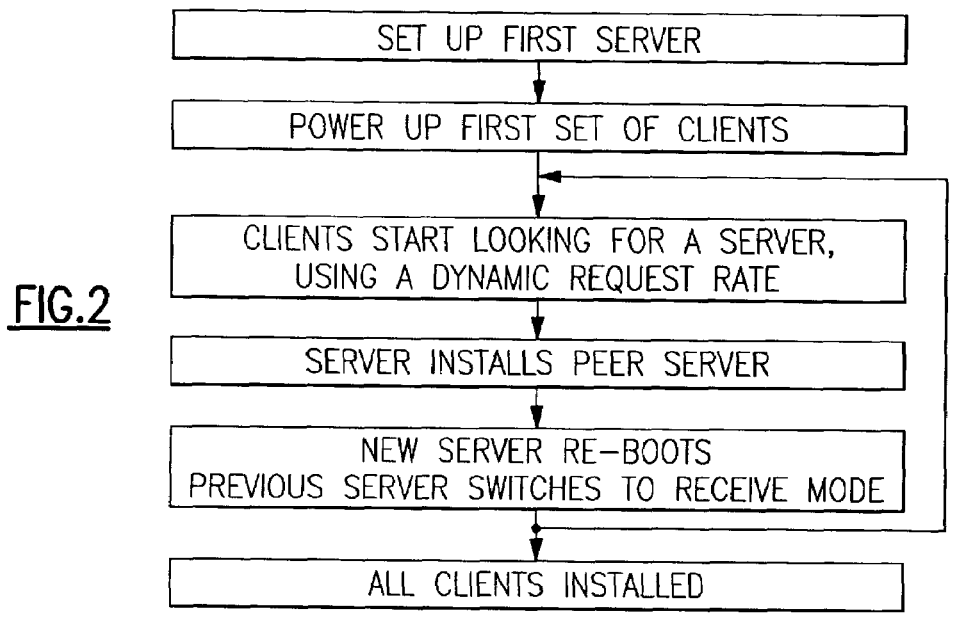
FIG. 2 shows an installation sequence according to the invention.

The basic installation flow may be summarized with reference to FIG. 2:

1. The primary (first) node is installed from a CD (or from a diskette, from the internet, or from any well known method of installing an OS) with an operating system image, software packages, and any services required to replicate itself.

2. Required services are started on the primary server.

3. The clients are powered up (preferably all clients at once).

4. The clients, once powered up, start to broadcast looking for a server and using the CBRM for the process.

5. The server responds to a client, attaching itself to the client, then shuts down its DHCP service.

6. The server installs a single node, installing it with an operating system image, installable images, and any required services.

7. The new server reboots itself as a peer server, and the old server restarts DHCP to re-attach to a new client.

8. Once the new server completes reboot, it starts to broadcast looking for a client.

9. The new servers broadcast and look for a client to attach to, until all nodes in the cluster are installed.

In current practice, when a node is powered on it begins what is characterized as a "dumb broadcast". It broadcasts looking for a server at regular, short intervals. Powering on many clients at once, all invoking the dumb broadcast method, starts a broadcast storm which saturates the network, typically making all network communication impossible. Some machine BIOSs are instructed that if the client does not receive a DHCP answer to its broadcast after a short number of broadcasts (about 60 seconds) the node will be rebooted.

The CBRM raises the intelligence of the broadcast on the client, assuming that the client may be broadcasting for many hours (or even days in a very large cluster) before finding an appropriate server, greatly reducing network traffic and the likelihood of broadcast storms.

Client Broadcast Regulation Method

The CBRM is dynamic, relying on sensitivity to the network status to limit storms. When the CBRM is started on a node, the broadcasts at a moderately slow rate, e.g. 6 times per minute. While broadcasting, the node monitors the total number of broadcasts occurring on the network and determines the total rate of broadcast. This rate is then compared with a stored target request rate. If the total rate is less than the target rate, the node's own broadcast rate is increased by an amount proportionate to the difference between the target rate and the total rate. Conversely, if the total rate is greater than the target rate, the node's broadcast rate is decreased by a proportionate amount. In this manner, each node's rate of broadcast will trend towards a value to maintain a total rate that is near the target rate. The total number of broadcasts and the total number of broadcasts by other clients are simply related and are equivalent for purposes of adjusting the individual response rate.

Since the total rate will tend to vary, sometimes greatly, a target rate should be chosen with a margin to allow for large fluctuations. The target rate would be set at a small portion of total network bandwidth, perhaps 1%. Since DHCP broadcasts are very small, this will allow a significant number of broadcasts to occur and allow space for rate spikes that may occur. Experience with a particular network will permit adjustment of the rate by the system administrator.

It should be noted that it is not important that the client could broadcast more rapidly and therefore potentially find a server seconds earlier. The purpose of the invention is the avoidance of broadcast storms. It is this very issue of rapid, uncontrolled broadcasts that cause the broadcast storms. By controlling the broadcast interval, CBRM alleviates the problem of spurious network traffic.

Referring again to FIG. 2, the following amplifies the chart:

The Clients start up (assumed to be the entire set) broadcasting at 6/min.

Each Client reads the total rate from the network, comparing it with the target broadcast rate (obtained either during network setup or by a broadcast message).

Each Client compares the actual rate to the target rate. In this example, the target rate is assumed to be 60/min and the current rate due to other clients is 30/min.

Since the current rate is lower than the target, the client's rate is increased by a proportion, for example, half the difference. In this case the difference is 54/min so the client's rate is increased by 27/min to 33/min. The other clients also increase their rates.

Since no server has answered, the client continues broadcasting at this rate, and after a period, reevaluates the rate. The period may be determined with some variation; e.g. x seconds +/−y, where y is a random number in a range of 10% of x. This will reduce spikes from clients increasing or decreasing at the same time.

This time, due to the client's own increased rate, the total rate is 63/min.

Since the total rate is now higher than the target rate, the client decreases its rate. It again adjusts by half of the difference, decreasing by 1.5/min. This puts the client's rate at 31/min (rounding).

This process continues until the client is answered by a server.

Server Response Regulation Method and IP address Allocation

Once the process is well along in a large cluster, there will be many servers able to respond, so that it is advantageous to have a method to avoid a "response storm" where too many servers respond to individual requests. In order to prevent this from happening, the Server Response Regulation Method (SRRM) is employed. With SRRM the average number of machines that will respond to any response is always approximately one. The cluster can be seen as having two resources which are conserved globally. One of these is the probability of response (which begins at 100%), the other is the IP addresses within the network (illustratively 10.0.0.0.8 using the TCP convention). Every time a server installs a client it divides its share of these resources equally between itself and its client.

Figure 3:
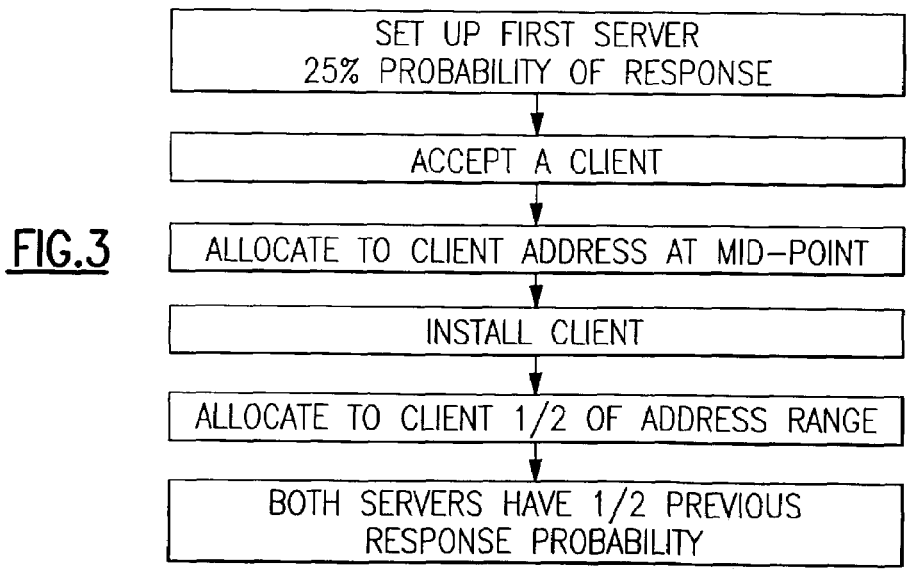
FIG. 3 shows a portion of the sequence of FIG. 2.

Referring to FIG. 3, an example is:

During the first install period, the first server has illustratively a 25% chance of answering a client request, based on a random number generator.

It (eventually) accepts a client request to be installed. The server owns the IP addresses in the well known IP address range (for TCP) between 10.64.0.0 and 10.127.255.255. The server allocates the client an IP address of 10.96.0.1 (which is ½ of the way through the server's IP range). The server then installs the operating system on the client.

Before the client disconnects from the server, it requests an IP address block that it (the client) will assign to new clients when it installs them. The server gives away ½ of its IP address block to the client. There is an advantage to having the IP addresses assigned dynamically—there is no single point of control for the IP addresses, and therefore no single bottleneck. A practical advantage of having the address halfway into the available address block is that the assignment of IP addresses is dynamic and uncontrolled. With this algorithm, the full block of IP addresses is only sparsely used. This does not adversely affect the cluster because this block of IP addresses is not reflected outside of the cluster and so every cluster can use the same IP addresses.

If a node fails after having received a block of addresses, it will not affect the rest of the cluster getting installed. The failed node will have reserved some IP addresses, but that doesn't matter. The number of possible addresses is so much greater than any reasonable cluster that running out of IP addresses is not a practical concern.

The client requests a response percentage. The server gives away ½ of its response percentage. Now both the client and the server have exactly the same chance (12.5%) of responding to an client install request, as well as exactly the same number of IP addresses to give away. The initial value of 25% and the fraction given away can be tuned by a system administrator.

The process then starts all over again.

The installation process is over when no request is placed on the network for a period determined by the system administrator.

With this method, the work of installation tends to get evenly dispersed across the cluster. Because the ability of a Server to respond to a client request is probabilistic, more than one server may respond to a particular request. However, in the average case approximately 1 server will respond. As the cluster grows even larger the odds that any more than a couple of servers will respond to the request exponentially decreases, thus preventing the possibility of response storms.

The methods of the invention (SRIM and CBRM) may be implemented in many ways. One approach is the use of a specialized BIOS (firmware) that supports CBRM on each node, or on the network communication card of each node. This has the advantage that it does not require modifying the operating system being installed. Another approach is a program that is part of the installation package—is invoked on the first re-boot after installation and shuts itself off when the installation process is over. Those skilled in the art will readily be able to devise other methods. In any event, the driving program will force the network communication card to follow the CBRM method for time delay between broadcasts (broadcast intervals). An alternate implementation would be to have the CBRM software directly on the network card itself. The node BIOS would start up the device driver for the network interface card, and the card would perform the CBRM itself. Whether the CBRM is implemented in the node BIOS or the network interface card BIOS will be transparent to the installation server.

Since this invention is intended to apply to a broad range of cluster sizes, those skilled in the art will expect that some configurations will install more quickly with this approach than some prior art approaches, but that some prior art approaches may produce a faster installation in some particular cases. The present invention is directed at flexibility, rather than at a specific configuration. The flexibility, especially for clusters of a scale that were previously impractical is deemed to be more beneficial than an approach customized for a particular configuration. Traditional bottlenecks have been eliminated by employing the CBRM instead of traditional broadcast methods. There were also arbitrary limits in prior methods—for example, a single node would install 16 other nodes and then stop.

Those skilled in the art will appreciate that many variations may be practiced within the scope of the invention—e.g. the address range of a server could be dynamic—increasing the number of potential clients if the installation rate slows down. Similarly, the response percentage number could be dynamic. The servers could give away ¼ or some other fraction of their address ranges rather than ½. The criterion of network traffic could be the number of packets or bytes per unit time (compared with capacity) rather than the number of requests per unit time, thereby allowing for larger or smaller operating systems and faster or slower networks. The method is not limited to initial installation of operating systems such as Linux, but can be applied to application programs (with appropriate installation software associated with them) and to upgrades. The term "operating software" means the software that performs the function in question, whether operating the computer or performing calculations in a weather forecasting program.

While the invention has been described in terms of a single preferred embodiment, those skilled in the art will recognize that the invention can be practiced in various versions within the spirit and scope of the following claims.

What is claimed is:

1. A method of installing computer programs in a network having a set of computers comprising the steps of:
   providing a first installation computer having operating software and installation software;
   providing a set of at least one client computer broadcasting installation requests at a dynamically adjustable rate; in which a client computer initially broadcasts installation requests at an initial request rate and monitors the total installation request rate carried on said network, wherein said installation requests include requests for operating system software; and said client computer adjusts its own broadcast rate by comparing said total installation request rate with a target installation request rate and adjusting its own rate by an adjustment amount that depends on the difference between said total installation request rate and said target request rate;

said first installing computer responds to a first installation request and installs both said operating software and installation software on a first client computer of said set of computers, thereby establishing said client computer as a secondary installation computer, and during which installation operation, said first installing computer ignores installation requests;

upon completion of the first installation, both said first installing computer and said secondary installation computer service installation requests by installing both said operating software and installation software.

2. A method of installing computer programs in a network according to claim 1, in which said adjustment amount is linearly proportional to said difference between said total installation request rate and said target request rate.

3. A method of installing computer programs in a network according to claim 1, in which said target rate is proportional to the total network bandwidth rate.

4. A method of installing computer programs in a network according to claim 3, in which said target rate is less than 10% of the total network bandwidth rate.

5. A method of installing computer programs in a network according to claim 1, in which an installing computer responds to an installation request received by it in a probabilistic manner.

6. A method of installing computer programs in a network according to claim 5, in which an installing computer responds to a first installation request received by it according to an initial reference probability.

7. A method of installing computer programs in a network a client computer according to claim 6, in which an installing computer responds to an installation request received by it according to a current installation probability and, upon completing an installation request responded to by it reduces its current installation probability by a reduction factor to calculate a new current installation probability with which it will respond to future requests.

8. A method of installing computer programs in a network according to claim 7, in which said installing computer transmits to a newly-installed client computer, now a secondary installation computer, said new current installation probability, whereby said newly-installed secondary installation computer responds to installation requests with said new current installation probability.

9. A method of installing computer programs in a network according to claim 8, in which said reduction factor is ½, whereby said installing computer and said secondary installation computer have the same probability and the total probability of response of said installing computer and said secondary installation computer is the same as the previous probability of response of said installing computer.

10. A method of installing computer programs in a network according to claim 5, in which said first installing computer has a network address that is halfway in a network address range and said first installing computer assigns to each secondary installation computer installed by it a secondary installation computer network address range that is half of said first installing computer's then-current network address range and a network address that is halfway in said secondary installation computer network address range.

11. A method of installing computer programs in a network according to claim 7, in which said first installing computer has a network address that is halfway in a network address range and said first installing computer assigns to each secondary installation computer installed by it a secondary installation computer network address range that is half of said first installing computer's then-current network address range and a network address that is halfway in said secondary installation computer network address range.

12. A method of installing computer programs in a network according to claim 9, in which said first installing computer has a network address that is halfway in a network address range and said first installing computer assigns to each secondary installation computer installed by it a secondary installation computer network address range that is half of said first installing computer's then-current network address range and a network address that is halfway in said secondary installation computer network address range.

13. An article of manufacture in computer readable form comprising means for performing a method of installing computer programs in a network having a set of computers comprising the steps of:

providing a first installation computer having operating software and installation software;

providing a set of at least one client computer broadcasting installation requests at a dynamically adjustable rate; in which a client computer initially broadcasts installation requests at an initial request rate and monitors the total installation request rate carried on said network, wherein said installation requests include requests for operating system software; and said client computer adjusts its own broadcast rate by comparing said total installation request rate with a target installation request rate and adjusting its own rate by an adjustment amount that depends on the difference between said total installation request rate and said target request rate;

said first installing computer responds to a first installation request and installs both said operating software and installation software on a first client computer of said set of computers, thereby establishing said client computer as a secondary installation computer, and during which installation operation, said first installing computer ignores installation requests;

upon completion of the first installation, both said first installing computer and said secondary installation computer service installation requests by installing both said operating software and installation software.

14. An article of manufacture according to claim 13, in which said adjustment amount is linearly proportional to said difference between said total installation request rate and said target request rate.

15. An article of manufacture according to claim 13, in which an installing computer responds to an installation request received by it in a probabilistic manner.

16. An article of manufacture according to claim 15, in which an installing computer responds to a first installation request received by it according to an initial reference probability.

17. An article of manufacture according to claim 16, in which an installing computer responds to an installation request received by it according to a current installation probability and, upon completing an installation request responded to by it reduces its current installation probability by a reduction factor to calculate a new current installation probability with which it will respond to future requests.

18. A computer system having a set of computers connected by a network and containing a set of computers operating a program in computer readable form adapted for carrying out a method comprising the steps of:

providing a first installation computer having operating software and installation software; in which a client computer initially broadcasts installation requests at an initial request rate and monitors the total installation request rate carried on said network, wherein said installation requests include requests for operating system software; and said client computer adjusts its own broadcast rate by comparing said total installation request rate with a target installation request rate and adjusting its own rate by an adjustment amount that depends on the difference between said total installation request rate and said target request rate;

providing a set of at least one client computer broadcasting installation requests at a dynamically adjustable rate; in which said first installing computer responds to a first installation request and installs both said operating software and installation software on a first client computer of said set of computers, thereby establishing said client computer as a secondary installation computer, and during which installation operation, said first installing computer ignores installation requests;

upon completion of the first installation, both said first installing computer and said secondary installation computer service installation requests by installing both said operating software and installation software.

19. A computer system according to claim 18, in which said adjustment amount is linearly proportional to said difference between said total installation request rate and said target request rate.

20. A computer system according to claim 19, in which an installing computer responds to an installation request received by it in a probabilistic manner.

21. A computer system according to claim 20, in which an installing computer responds to a first installation request received by it according to an initial reference probability.

22. A computer system according to claim 21, in which an installing computer responds to an installation request received by it according to a current installation probability and, upon completing an installation request responded to by it reduces its current installation probability by a reduction factor to calculate a new current installation probability with which it will respond to future requests.

* * * * *